No. 761,370. PATENTED MAY 31, 1904.
S. H. GARST.
DRAFT EQUALIZER.
APPLICATION FILED SEPT. 28, 1903.
NO MODEL.

Inventor
Stephen H. Garst

Witnesses
James R. Perry
Geo. H. Grover

By
James Whittemore
Atty.

No. 761,370. Patented May 31, 1904.

UNITED STATES PATENT OFFICE.

STEPHEN H. GARST, OF DETROIT, MICHIGAN, ASSIGNOR TO AMERICAN HARROW COMPANY, OF DETROIT, MICHIGAN, A CORPORATION OF MICHIGAN.

DRAFT-EQUALIZER.

SPECIFICATION forming part of Letters Patent No. 761,370, dated May 31, 1904.

Application filed September 28, 1903. Serial No. 174,954. (No model.)

*To all whom it may concern:*

Be it known that I, STEPHEN H. GARST, a citizen of the United States, residing at Detroit, in the county of Wayne and State of Michigan, have invented certain new and useful Improvements in Draft Apparatus, of which the following is a specification, reference being had therein to the accompanying drawings.

The invention relates to draft apparatus, and has more particular reference to a construction which is adapted for use with either three or four horses.

In the present state of the art various forms of draft apparatus have been devised for use with three horses. Other constructions have been made which may be used with either three or four horses; but with these latter the adjustment for the three horses have not proven satisfactory. This is for the reason that two of the horses must be arranged upon one side of the tongue or pole, while the third is upon the opposite side, and in order to produce equal draft this third horse is positioned a considerably greater distance from the pole than the inner horse of the pair. Moreover, the middle horse is usually crowded against the pole, so as to interfere with his work.

It is the object of the present invention to obtain a construction in which the third horse may be used and will be arranged in more convenient position for work—that is, the pair of horses on one side of the pole are arranged a further distance therefrom and the third horse is brought nearer the pole, while at the same time the draft of the third horse is absolutely equalized.

Figure 1:
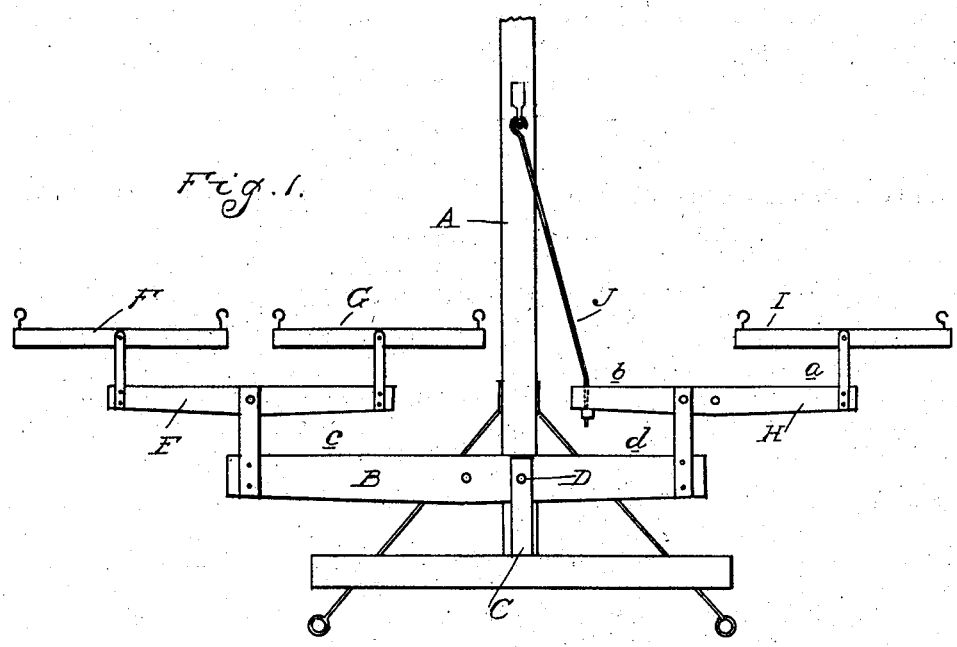
Figure 2:
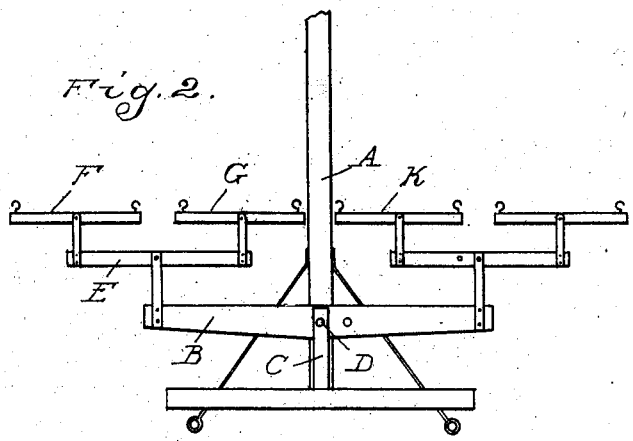

In the drawings, Figure 1 is a plan illustrating the draft apparatus as arranged for three horses, and Fig. 2 is a similar view showing it arranged for four horses.

A is a draft-pole of any suitable construction and attached by any suitable means to the vehicle. (Not shown.)

B is an evener, which is pivotally secured to the pole A, preferably by means of the bracket C and bolt or pin D.

E is a doubletree attached to one end of the evener B, and F and G are swingletrees secured to the doubletree E.

H is a second doubletree, secured to the opposite end of the evener B and having secured to one end thereof the swingletree I, while its opposite end is connected by the link J with the pole A.

With the construction thus far described the draft of the swingletrees F, G, and I is equalized, for the reason that the doubletree E will balance the swingletrees F and G, and the doubletree H, in connection with the link J, will balance the draft of the swingletree I with that of F and G. If, however, the levers B, E, and H are all even levers, the result will be that the swingletree I will be arranged as far from the pole A as the swingletree F, while the swingletree G will be crowded into close proximity to the pole. To overcome this objection, the opposite ends of the lever B are made of unequal length, so as to arrange the point of attachment of the doubletree E at a greater distance from the pole than the point of attachment of the doubletree H. This arrangement will of necessity give an advantage in leverage to the doubletree E, but will shift the swingletrees F and G a greater distance from the pole. To offset the advantage in leverage, the doubletree H is also made an uneven lever, the ratio between the length of its outer and inner ends $a$ and $b$ being the same as the ratio between the ends $c$ and $d$ of the evener B. This will exactly equalize the draft of the three swingletrees, and inasmuch as the total length of the swingletree H is considerably less than the total length of the evener B the swingletree I will be shifted nearer the pole.

Where it is desired to use the draft apparatus for four horses, it is only necessary to shift the evener B and doubletree H so as to form equal levers thereof and to substitute a fourth swingletree K for the link J.

What I claim as my invention is—

1. A draft apparatus comprising a pole an evener secured thereto, doubletrees secured to opposite ends of said evener, swingletrees secured to opposite ends of one of said doubletrees, and to one end of the second doubletree, and an elongated link secured at one end to the opposite end of the latter and pivotally secured to the pole.

2. A draft apparatus comprising an evener having oppositely-extending arms of unequal length, a bracket upon the pole extending over the evener, and a pivot-pin passing through the pole, evener and bracket, a doubletree secured to the longer arm of the evener, and swingletree for the shorter arm, and an intermediate lever pivotally secured at one side of its center thereto forming a connection between said swingletree, and evener, adapted to equalize the draft thereof, with that of said doubletree.

3. A draft apparatus, comprising a pole, an evener having a fixed pivotal connection at one side of its center to the pole, doubletrees having a fixed pivotal engagement with the opposite end of the evener, both of said doubletrees being spaced from the pole, swingletrees secured to opposite ends of the trees at the longer end of the evener, and to one end of the opposite doubletree, and a connection between the opposite end of the latter and the pole.

In testimony whereof I affix my signature in presence of two witnesses.

STEPHEN H. GARST.

Witnesses:
W. H. DODD,
J. W. HOOPER.